US011432986B2

(12) United States Patent
Lee et al.

(10) Patent No.: US 11,432,986 B2
(45) Date of Patent: Sep. 6, 2022

(54) MOTION ASSISTANCE APPARATUS

(71) Applicant: Samsung Electronics Co., Ltd., Suwon-si (KR)

(72) Inventors: Jongwon Lee, Hwasung-si (KR); Youn Baek Lee, Yongin-si (KR); Se-Gon Roh, Suwon-si (KR); Minhyung Lee, Anyang-si (KR); Byungjune Choi, Gunpo-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 232 days.

(21) Appl. No.: 16/531,895

(22) Filed: Aug. 5, 2019

(65) Prior Publication Data

US 2020/0129367 A1    Apr. 30, 2020

(30) Foreign Application Priority Data

Oct. 30, 2018  (KR) .................. 10-2018-0131045

(51) Int. Cl.
  *A61H 3/00*    (2006.01)
  *B25J 9/00*    (2006.01)
(52) U.S. Cl.
  CPC .............. *A61H 3/00* (2013.01); *A61H 3/008* (2013.01); *B25J 9/0006* (2013.01); *A61H 2003/007* (2013.01); *A61H 2201/165* (2013.01); *A61H 2201/1642* (2013.01); *A61H 2205/10* (2013.01)
(58) Field of Classification Search
  CPC .............. A61H 2003/007; A61H 3/00; A61H 2201/163; A61H 2205/108; A61H 2005/0167; A61H 2003/001
  See application file for complete search history.

(56) References Cited

U.S. PATENT DOCUMENTS

| 6,039,707 | A  | 3/2000  | Crawford et al. |
| 7,780,616 | B2 | 8/2010  | Katoh et al. |
| 8,313,448 | B2 | 11/2012 | Shimada et al. |
| 8,545,424 | B2 | 10/2013 | Hirata et al. |
| 9,744,066 | B2 | 8/2017  | Kazerooni et al. |
| 9,884,421 | B2 | 2/2018  | Garrett et al. |
| 2006/0241539 | A1 | 10/2006 | Agrawal et al. |

(Continued)

FOREIGN PATENT DOCUMENTS

| EP | 2 612 625 A1 | 7/2013 |
| EP | 2856997 A2   | 4/2015 |

(Continued)

OTHER PUBLICATIONS

Partial European Search Report dated Mar. 25, 2020, for the corresponding EP Application No. 19204918.7.

(Continued)

*Primary Examiner* — Suba Ganesan
(74) *Attorney, Agent, or Firm* — Harness, Dickey & Pierce, P.L.C.

(57) ABSTRACT

A motion assistance apparatus includes a waist frame configured to support a waist of a user, and a proximal support configured to support a proximal part of the user. A pressure applied to a thigh of the user by the proximal support in a sitting state in which the user is sitting may be greater than a pressure applied to the thigh of the user by the proximal support in a standing state in which the user is standing upright.

6 Claims, 17 Drawing Sheets

(56) References Cited

U.S. PATENT DOCUMENTS

| | | |
|---|---|---|
| 2008/0009778 A1 | 1/2008 | Hiki |
| 2011/0040216 A1 | 2/2011 | Herr et al. |
| 2013/0331744 A1* | 12/2013 | Kamon .................... A61H 3/00 |
| | | 601/35 |
| 2017/0340505 A1 | 11/2017 | Havida |
| 2017/0348176 A1 | 12/2017 | Herr et al. |
| 2018/0021943 A1 | 1/2018 | Angold et al. |
| 2018/0111263 A1 | 4/2018 | Van Engelhoven et al. |
| 2018/0125692 A1 | 5/2018 | Takenaka et al. |
| 2018/0147108 A1 | 5/2018 | Lee et al. |
| 2018/0177670 A1 | 6/2018 | Shim et al. |
| 2018/0200878 A1* | 7/2018 | Tsai ......................... A61H 3/00 |

FOREIGN PATENT DOCUMENTS

| | | |
|---|---|---|
| EP | 3 326 602 A1 | 5/2018 |
| KR | 20150134770 A | 12/2015 |
| KR | 20170027448 A | 3/2017 |
| KR | 20170111849 A | 10/2017 |
| KR | 20180053267 A | 5/2018 |
| WO | WO-2012/070244 A1 | 5/2012 |
| WO | WO-2015/018340 A1 | 2/2015 |

OTHER PUBLICATIONS

Extended European Search Reported dated Aug. 18, 2020 for Application No. EP 19204918.7.
Extended European Search Report dated Jan. 31, 2022 for Application No. EP 21198949.6.

* cited by examiner

MOTION ASSISTANCE APPARATUS

CROSS-REFERENCE TO RELATED APPLICATION

This application claims under 35 U.S.C. § 119 to Korean Patent Application No. 10-2018-0131045, filed on Oct. 30, 2018, in the Korean Intellectual Property Office, the entire contents of which are incorporated herein by reference in its entirety.

BACKGROUND

1. Field

At least one example embodiment relates to a motion assistance apparatus.

2. Description of the Related Art

Motion assistance apparatuses enabling the elderly or patients having joint problems to walk with less effort, and apparatuses for assisting muscular strength of users, for example, for military purposes are being developed.

SUMMARY

Some example embodiments relate to a motion assistance apparatus.

In some example embodiments, the motion assistance apparatus may include a waist frame configured to support a waist of a user; and a proximal support configured to support a proximal part of the user such that a pressure applied to a thigh of the user by the proximal support when the user is in a sitting state is greater than the pressure applied to the thigh of the user by the proximal support when the user is in a standing state.

In some example embodiments, the proximal support is configured to apply the pressure to the proximal part of the user such that the pressure gradually increases while the user transitions from standing state to the sitting state.

In some example embodiments, the proximal support is configured to support a rear surface of the proximal part of the user.

In some example embodiments, the motion assistance apparatus further includes a distal support rotatably connected to the proximal support, the distal support configured to support a distal part of the user; and an actuator configured to adjust an angle between the distal support and the proximal support.

In some example embodiments, the proximal support includes a proximal action portion configured to cover at least a portion of one or more of the thigh or a hip of the user.

In some example embodiments, the motion assistance apparatus further includes a proximal action portion configured to support a hip of the user, the proximal action portion including a first end and a second end, the first end being connected to the proximal support and the second end being connected to the waist frame.

Some example embodiments relate to a motion assistance apparatus.

In some example embodiments, the motion assistance apparatus may include a waist frame configured to support a waist of a user; a proximal support configured to support a proximal part of the user; and a rotary coupler configured to rotatably couple the waist frame and the proximal support at a selected one of a plurality of different positions such that a position at which the proximal support is connected to the waist frame via the rotary coupler varies based on the selected one of the plurality of different positions.

In some example embodiments, the waist frame includes an axis adjustment guide on the waist frame such that the axis adjustment guide is tilted upward toward a rear side of the waist frame, the axis adjustment guide configured to adjust a relative position between the waist frame and the rotary coupler.

In some example embodiments, the rotary coupler includes a base installable in the axis adjustment guide at different ones of the plurality of different positions; and a rotating body rotatably connected to the base.

In some example embodiments, the proximal support includes a length adjustment guide on the proximal support, the length adjustment guide configured to adjust a relative position between the rotary coupler and the proximal support.

In some example embodiments, the axis adjustment guide has a plurality of axis adjustment holes arranged in parallel therein.

In some example embodiments, the axis adjustment guide is tilted upward and backward at 45 degrees when the user is in a standing state.

In some example embodiments, the proximal support includes a proximal frame perpendicular to a ground when the user is in a standing state; and a proximal extension extending backward and upward from the proximal frame, the proximal extension configured to connect to the rotary coupler.

In some example embodiments, the proximal support is configured to support a rear surface of the proximal part of the user, and the motion assistance apparatus further includes a distal support rotatably connected to the proximal support, the distal support configured to support a distal part of the user; and an actuator configured to generate a force to change an angle between the distal support and a proximal frame.

Some example embodiments relate to a motion assistance apparatus.

In some example embodiments, the motion assistance apparatus may include a waist frame configured to support a waist of a user; and a proximal support configured to simultaneously perform a rotation and a translation with respect to the waist frame.

In some example embodiments, the proximal support is configured to perform the translation toward an upper side of the waist frame in response to the user transitioning from a standing state to a sitting state.

In some example embodiments, the proximal support includes a first guide slot and a second guide slot, the second guide slot being on a side further to a rear side of the user than the first guide slot, and the waist frame includes a first projection and a second projection, the second projection spaced apart from the first projection by a projection distance, the first projection and the second projection configured to penetrate the first guide slot and the second guide slot, respectively.

In some example embodiments, from upper ends of the first guide slot and the second guide slot to lower ends of the first guide slot and the second guide slot, a slot distance between a center axis of the first guide slot and the second guide slot remains equal to the projection distance between the first projection and the second projection.

In some example embodiments, a first length of the first guide slot is different than a second length of the second guide slot.

In some example embodiments, the first length of the first guide slot is greater than the second length of the second guide slot.

In some example embodiments the proximal support and the waist frame are configured such that, when the user is in a standing state, a center of a virtual line connecting the first projection and the second projection is higher than a center of a virtual line connecting the lower ends of the first guide slot and the second guide slot.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
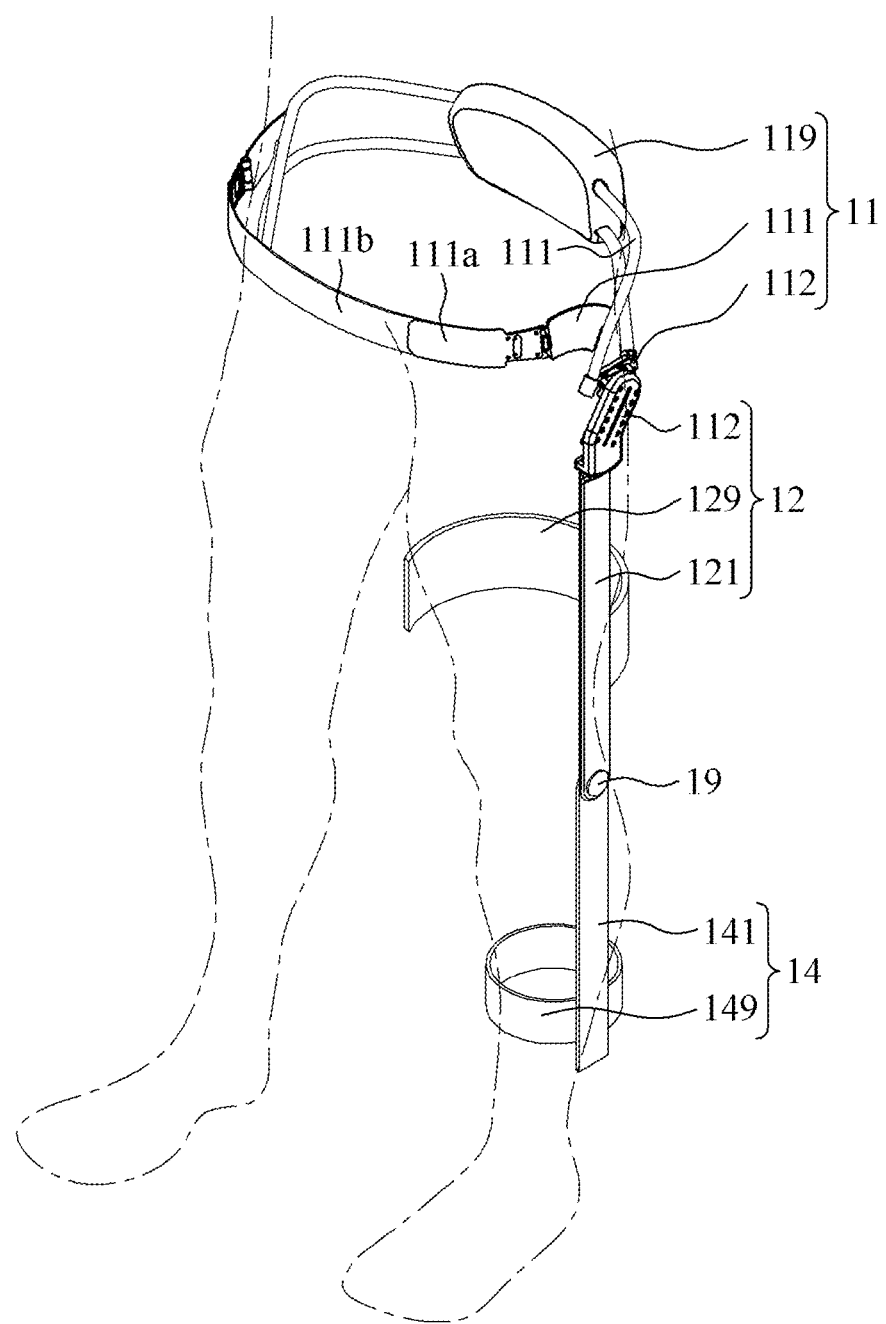
FIG. 1 is a perspective view illustrating a motion assistance apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
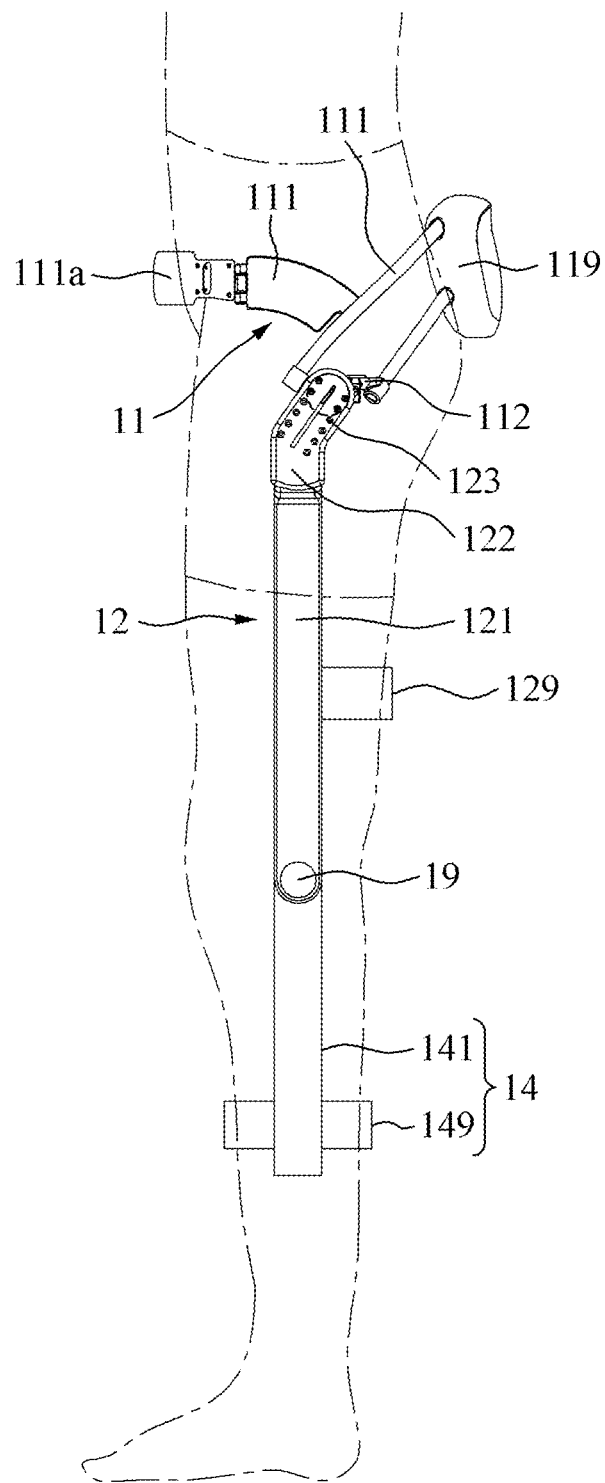
FIG. 2 is a side view illustrating a motion assistance apparatus according to at least one example embodiment.
Figure 3:
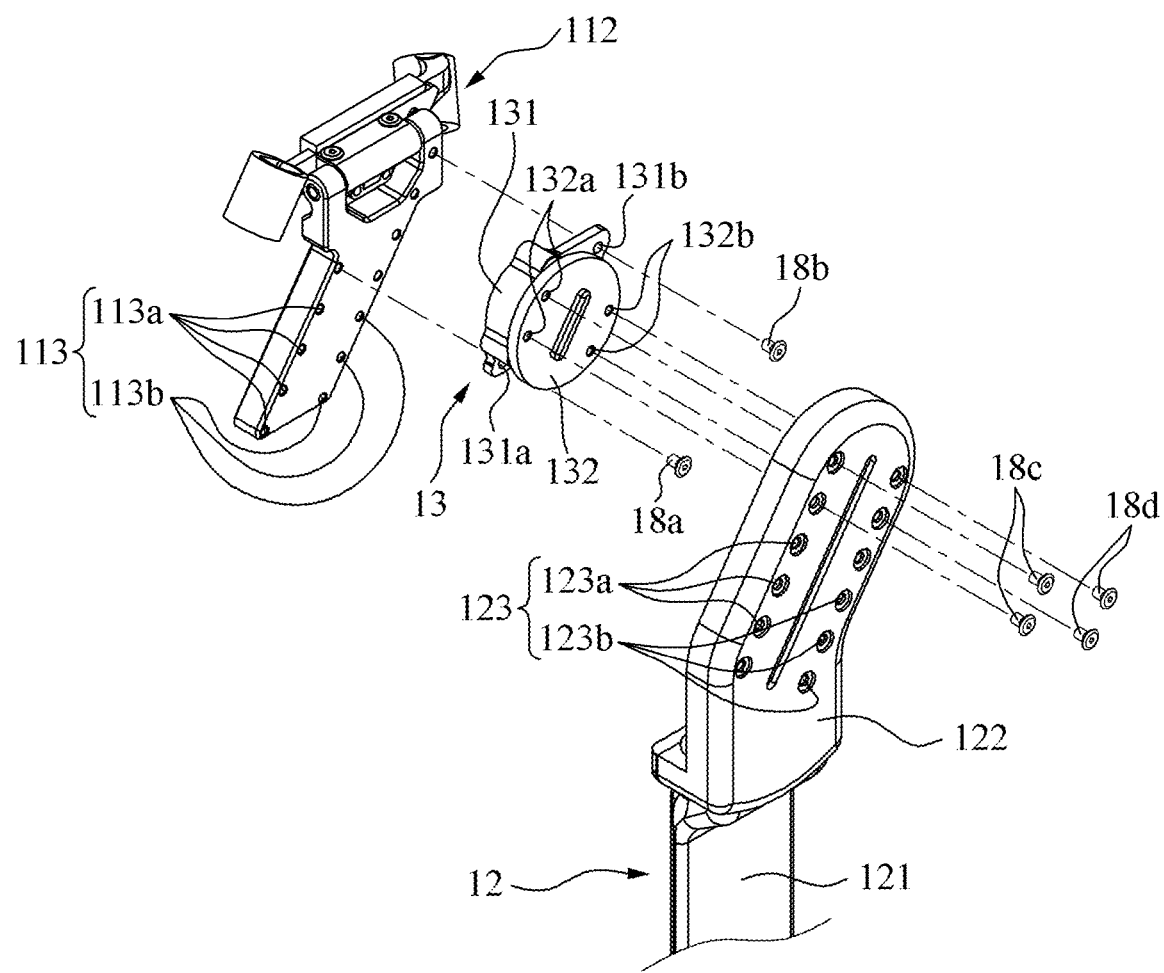
FIG. 3 is an exploded perspective view illustrating a motion assistance apparatus according to at least one example embodiment.

FIG. 1 is a perspective view illustrating a motion assistance apparatus according to at least one example embodiment, FIG. 2 is a side view illustrating a motion assistance apparatus according to at least one example embodiment, and FIG. 3 is an exploded perspective view illustrating a motion assistance apparatus according to at least one example embodiment.

Referring to FIGS. 1 through 3, a motion assistance apparatus 1 may be worn on a user to assist walking of the user. The user may be, for example, a human, an animal, or a robot, but is not limited thereto. The motion assistance apparatus 1 may operate about an axis that is misaligned with a hip joint axis of the user. The motion assistance apparatus 1 may apply a sufficient pressure to press a proximal part, for example, a thigh and/or hip, in a state in which a flexion angle of a knee joint is sufficiently large, for example, in a state in which the user is sitting or ascends stairs. When a power is transferred to a proximal support 12 for an extension of the knee joint, the motion assistance apparatus 1 may instantly rotate the thigh about a shin. In other words, the motion assistance apparatus 1 may increase a force transferred to a rear surface of the proximal part by reducing a force transferred to a waist and/or back and wasted, to efficiently assist the extension of the knee joint. Also, the motion assistance apparatus 1 may enhance a wearability of the user by reducing a problem of transferring an unnecessary force to the waist and/or back during the extension of the knee joint.

The motion assistance apparatus 1 may include a waist frame 11, the proximal support 12, a rotary coupler 13, a distal support 14 and an actuator 19.

The waist frame 11 may assist the waist of the user. The waist frame 11 may include a waist frame body 111, a waist extension 112, an axis adjustment guide 113 and a back part 119.

The waist frame body 111 may cover the waist of the user. The waist frame body 111 may be formed of a rigid material. The waist frame body 111 may include a buffering portion (not shown) formed of a flexible material to enhance the wearability.

The waist extension 112 may extend from the waist frame body 111 toward a hip joint of the user. An axis of the hip joint of the user may pass through the waist extension 112 when viewed from a side of the motion assistance apparatus 1. For example, the waist extension 112 may extend forward and downward from a rear portion of the waist frame body 111. For example, the waist extension 112 may be formed integrally with the waist frame body 111.

The axis adjustment guide 113 may guide a position of the rotary coupler 13 installed on the waist extension 112. The position of the rotary coupler 13 may correspond to a position of a rotation axis of the proximal support 12 with respect to the waist frame 11. Thus, by the axis adjustment guide 113, the position of the rotation axis of the proximal support 12 with respect to the waist frame 11 may be adjusted. By the above structure, the rotation axis of the proximal support 12 with respect to the waist frame 11 may be located above a hip joint axis of the user, and thus a sufficient pressure to push the rear surface of the proximal part may be applied in a state in which the flexion angle of the knee joint is sufficiently large.

The axis adjustment guide 113 may be formed on the waist extension 112. The axis adjustment guide 113 may be tilted upward toward a rear side of the waist extension 112. Based on a standing state in which the user is standing upright, the axis adjustment guide 113 may be tilted upward toward a rear side of the user at an angle of 40 degrees to 50 degrees, for example, 45 degrees.

The axis adjustment guide 113 may include a plurality of axis adjustment holes 113a and 113b that are arranged in parallel. The plurality of axis adjustment holes 113a and 113b may include a plurality of first holes 113a and a plurality of second holes 113b that are arranged in parallel. The plurality of axis adjustment holes 113a and 113b may be fastened and fixed by a fastening member, for example, a bolt, passing through the rotary coupler 13. For example, a first fastening member 18a may be fastened into a first hole 113a by passing through a first receiving portion 131a of the rotary coupler 13. Also, a second fastening member 18b may be fastened into a second hole 113b by passing through a second receiving portion 131b of the rotary coupler 13. The first receiving portion 131a and the second receiving portion 131b may be holes formed through the rotary coupler 13. The position of the rotary coupler 13 with respect to the waist extension 112 may be determined based on positions in which the first fastening member 18a and the second fastening member 18b are fastened. A shape of the axis adjustment holes 113a and 113b is necessarily not limited to a shape of a hole, and various shapes, for example, a shape of a slot that continues to be elongated may be provided.

The back part 119 may support the back of the user. The back part 119 may be fixed to one side of the waist frame body 111.

Figure 8:
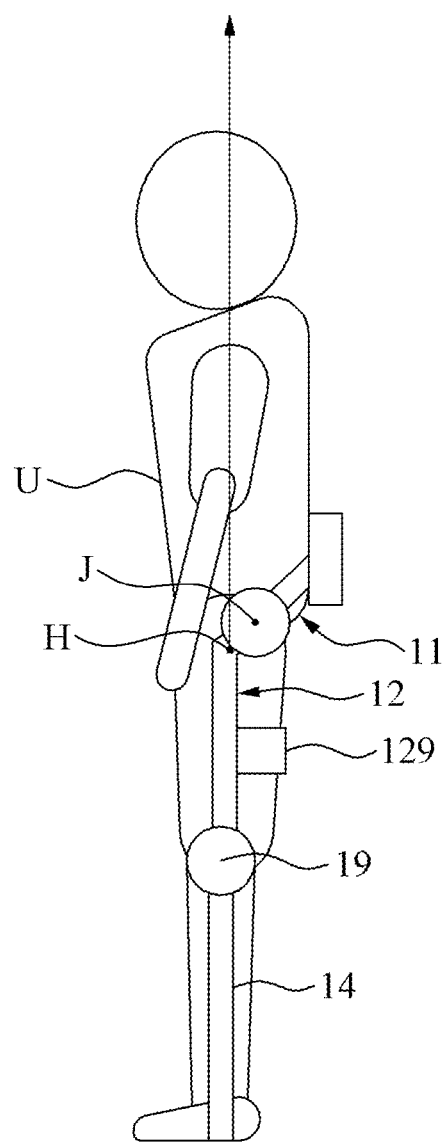
FIGS. 8 through 10 are side views illustrating a motion assistance apparatus according to at least one example embodiment.
Figure 10:
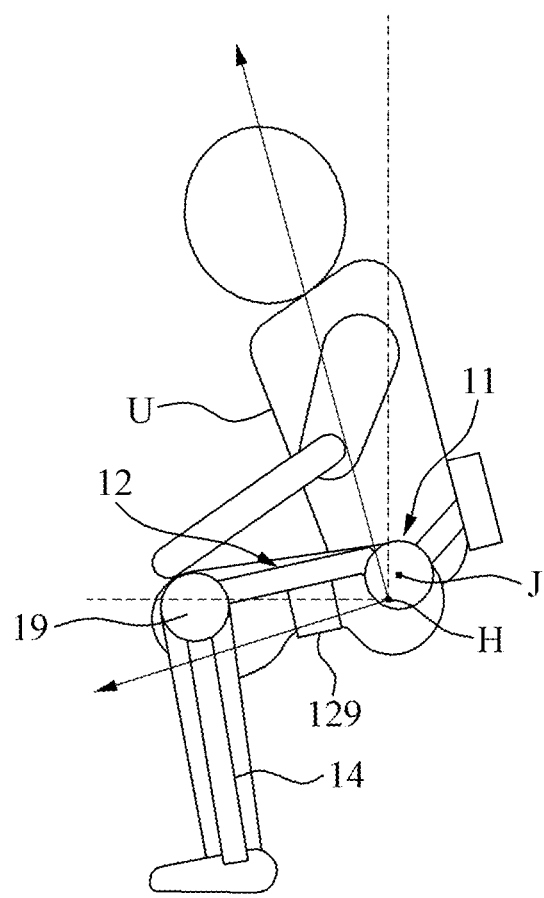

The proximal support 12 may support the proximal part of the user, for example, a thigh and/or hip. An example in which the proximal support 12 supports the thigh is described below. The proximal support 12 may be installed in the rotary coupler 13 installed on the waist frame 11. The proximal support 12 may support a rear surface of the thigh of the user. The proximal support 12 may increase an angle between the thigh and a shin by pressing the rear surface of the thigh while the user is extending the knee joint. The proximal support 12 may apply a pressure to the thigh so that the thigh may be pressed, in a sitting state in which the user is sitting by sufficiently flexing knees at about 60 degrees or greater as shown in FIG. 10. A pressure applied to the thigh by the proximal support 12 in a standing state in which the user stretches knees to the maximum as shown in FIG. 8 may be less than a pressure applied to the thigh by the proximal support 12 in the sitting state. For example, in the standing state, the proximal support 12 may not apply a pressure to the thigh. The proximal support 12 may include a proximal frame 121, a proximal extension 122, a length adjustment guide 123 and a proximal action portion 129.

The proximal frame 121 may be substantially parallel to the thigh of the user wearing the motion assistance apparatus 1. The proximal frame 121 may support the proximal action portion 129 that applies a force to the proximal part of the user. An angle between the thigh and the proximal frame 121 in the sitting state may be greater than an angle between the thigh and the proximal frame 121 in the standing state. Based on the standing state, the proximal frame 121 may be parallel to the thigh. An extension line of the proximal frame 121 may pass through the axis of the hip joint of the user when viewed from a side of the user.

The proximal extension 122 may be installed in the rotary coupler 13 and rotate about the waist frame 11. For example, the proximal extension 122 may be configured to extend upward and backward from the proximal frame 121. For example, the proximal extension 122 may be configured to cover the rotary coupler 13. The proximal extension 122 may fully cover a top surface of the rotary coupler 13 and may cover at least a portion of a side of the rotary coupler 13. By the above structure, the proximal extension 122 may prevent foreign substances from permeating into the rotation axis of the rotary coupler 13.

The length adjustment guide 123 may guide a position of the rotary coupler 13 installed on the proximal extension 122. Based on a relative position between the proximal extension 122 and the rotary coupler 13, a length from the rotation axis of the proximal support 12 with respect to the waist frame 11 to a distal end portion of the proximal support 12 may be determined. Also, based on a position of the distal end portion of the proximal support 12, a position of a rotation axis between the proximal support 12 and the distal support 14 may be determined. Thus, by the length adjustment guide 123, a length from the rotation axis of the proximal support 12 with respect to the waist frame 11 to a rotation axis of the distal support 14 with respect to the proximal support 12 may be adjusted. In other words, the length adjustment guide 123 may adjust a length of the proximal frame 121 extended from the rotary coupler 13. The length adjustment guide 123 may perform assistance so that a joint connected to the proximal frame 121 and the distal support 14 may be located around the knee joint of the user, despite a change in the position of the rotary coupler 13.

The length adjustment guide 123 may be formed in the proximal extension 122, in a longitudinal direction of the proximal extension 122. For example, based on a standing state in which the user is standing upright, the length adjustment guide 123 may be tilted upward toward the rear side of the user at an angle of 40 degrees to 50 degrees, for example, 45 degrees. The length adjustment guide 123 may include a plurality of length adjustment holes 123a and 123b that are arranged in parallel. The plurality of length adjustment holes 123a and 123b may include a plurality of first length adjustment holes 123a and a plurality of second length adjustment holes 123b that are arranged in parallel. The plurality of length adjustment holes 123a and 123b may be fastened and fixed by a fastening member, for example, a bolt, inserted into the rotary coupler 13 through the proximal extension 122. For example, a third fastening member 18c may be fastened to a third receiving portion 132a of the rotary coupler 13 by passing through the first length adjustment holes 123a, and a fourth fastening member 18d may be fastened to a fourth receiving portion 132b of the rotary coupler 13 by passing through the second length adjustment holes 123b. A shape of length adjustment holes 123a and 123b is necessarily not limited to a shape of a hole, and various shapes, for example, a shape of a slot that continues to be elongated may be provided.

The proximal action portion 129 may apply a force to the thigh of the user. For example, the proximal action portion 129 may be a curved plate that supports the rear surface of the thigh of the user, or a band that covers the thigh of the user. While the user is flexing the hip joint, a pressure applied to the rear surface of the thigh of the user by the proximal action portion 129 may gradually increase. In other words, while the user is flexing the hip joint, the proximal action portion 129 may more tightly press the rear surface of the thigh.

The rotary coupler 13 may rotatably connect the proximal support 12 to the waist frame 11. The rotation axis of the rotary coupler 13 may function as a rotation axis of the proximal support 12 about the waist frame 11. The rotary coupler 13 may include a base 131 and a rotating body 132.

The base 131 may be installed in the axis adjustment guide 113. The base 131 may include the first receiving portion 131a and the second receiving portion 131b that each fluidly communicate with one of the plurality of axis adjustment holes 113a and 113b. For example, the first receiving portion 131a may fluidly communicate with the first axis adjustment hole 113a, and the second receiving portion 131b may fluidly communicate with the second axis adjustment hole 113b.

One side of the rotating body 132 may be rotatably connected to the base 131, and another side may be fixed to the length adjustment guide 123. The rotating body 132 may include the third receiving portion 132a and the fourth receiving portion 132b that each fluidly communicate with one of the plurality of length adjustment holes 123a and 123b. For example, the third receiving portion 132a may fluidly communicate with the first length adjustment hole 123a, and the fourth receiving portion 132b may fluidly communicate with the second length adjustment holes 123b.

The distal support 14 may support a distal part, for example, a lower leg, of the user. The distal support 14 may be rotatably connected to the proximal support 12. The distal support 14 may include a distal frame 141 and a distal action portion 149.

The distal frame 141 may be rotatably connected to the proximal frame 121. In an example, the distal frame 141 may be pivotally connected to the proximal frame 121. In another example, the distal frame 141 may rotate while maintaining a rolling contact with the proximal frame 121. In example embodiments, a connection structure between the distal frame 141 and the proximal frame 121 is not limited.

The distal action portion 149 may be worn on the lower leg of the user, to apply a force to the lower leg. For example, the distal action portion 149 may be a curved plate that supports a rear surface of the lower leg, or a band that covers a shin.

The actuator 19 may adjust an angle between the proximal support 12 and the distal support 14 to assist a motion of the knee joint of the user. The actuator 19 may assist an extension of the knee joint by increasing the angle between the proximal support 12 and the distal support 14, and may assist a flexion of the knee joint by reducing the angle between the proximal support 12 and the distal support 14. For example, the actuator 19 may have a structure in which an end portion of the proximal support 12 and an end portion of the distal support 14 are rotatably connected to each other. However, example embodiments are not limited thereto, and a portion of the actuator 19 is installed in the proximal support 12, remaining portions of the actuator 19 are installed in the distal support 14, and components of the actuator 19 may interact with each other. Thus, the actuator 19 may have any structure capable of adjusting the angle between the proximal support 12 and the distal support 14. For example, the actuator 19 may transfer a power using any one or any combination of a gear train, a wire, a belt and a link.

For example, the motion assistance apparatus 1 may further include a controller (not shown). The controller may include a memory and processing circuitry.

The memory may include at least one of a volatile memory, non-volatile memory, random access memory (RAM), a flash memory, a hard disk drive, and an optical disk drive.

The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design or execution of computer readable instructions stored in the memory (not shown), as a special purpose computer to control the actuator 19. For example, in some example embodiments, the processing circuitry may be connected to one or more sensors (not shown), and receive sensor data from the one or more sensors to determine whether the user is attempting to transition from a sitting state to a standing state, and may control the actuator 19 based on a result of the sensing.

For example, the processing circuitry may be configured to control the actuator 19 to generate the power to rotate the distal support 14 based on the results of the sensing such that, due to the rotation axis of the proximal support 12 with respect to the waist frame 11 being offset above a hip joint axis of the user, the motion assistance apparatus 1 applies additional pressure to the thigh of the user to assist the user with the transition to the standing state. Therefore, since the thigh of the user may include relatively softer tissue than other parts of the body (e.g. the calf/ankle), the thigh of the user may be preloaded such that force is immediately transferable to the thigh of the user.

Figure 4:
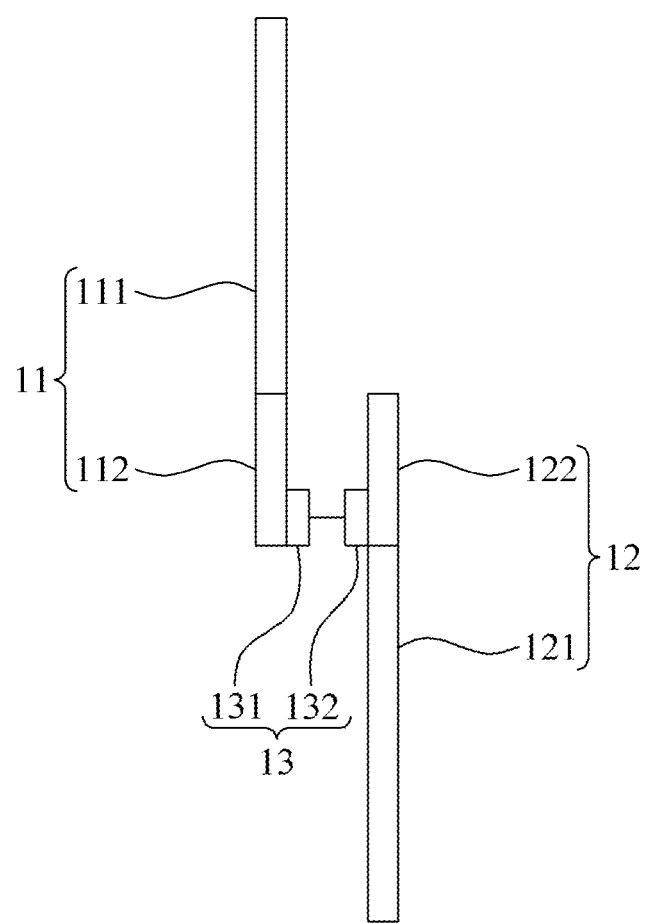
FIG. 4 is a front view schematically illustrating a motion assistance apparatus according to at least one example embodiment.
Figure 5:
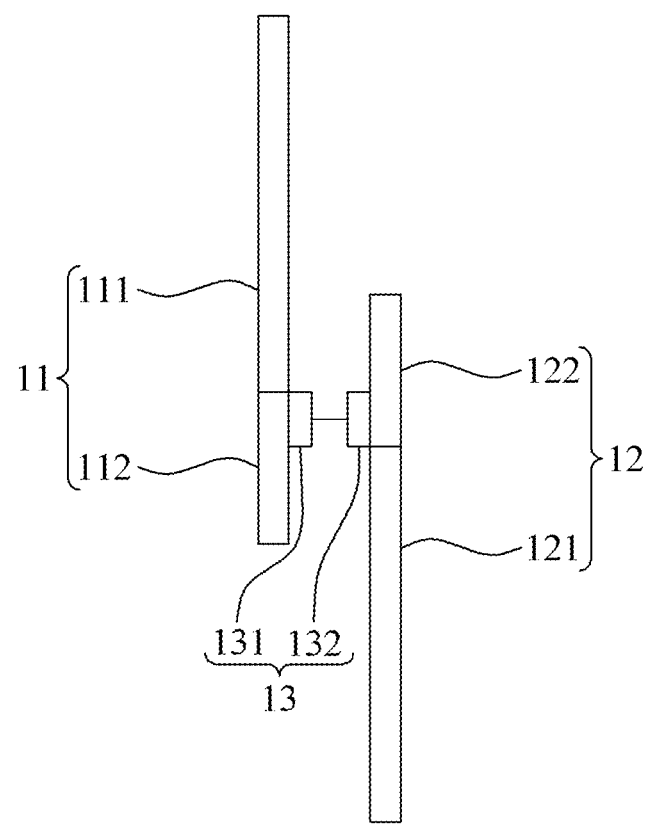
FIG. 5 is a front view illustrating a state in which a position of a rotary coupler with respect to a waist frame is changed in the motion assistance apparatus of FIG. 4.
Figure 6:
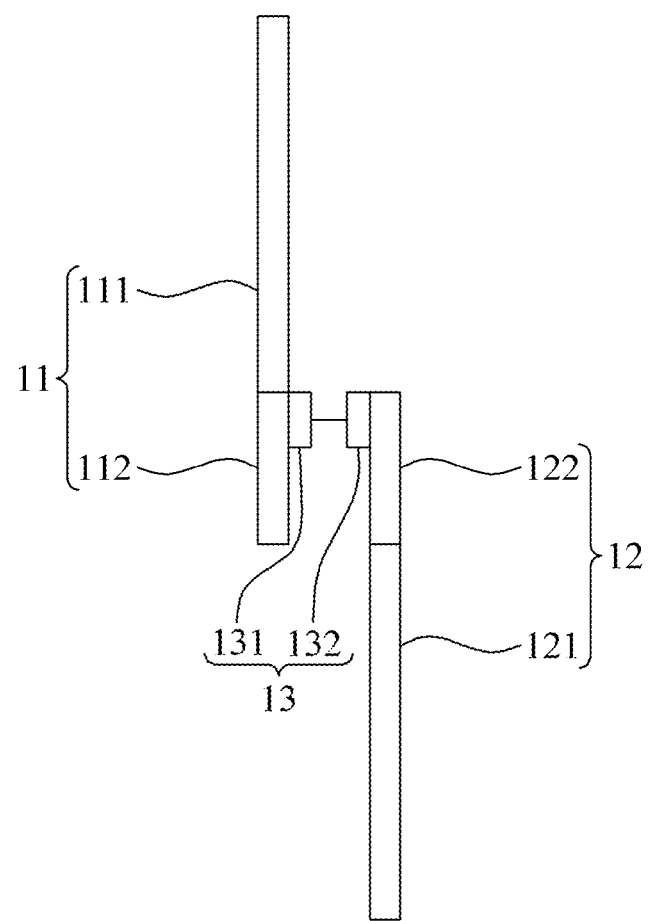
FIG. 6 is a front view illustrating a state in which a position of a proximal support with respect to the rotary coupler of FIG. 5 is changed.
Figure 7:
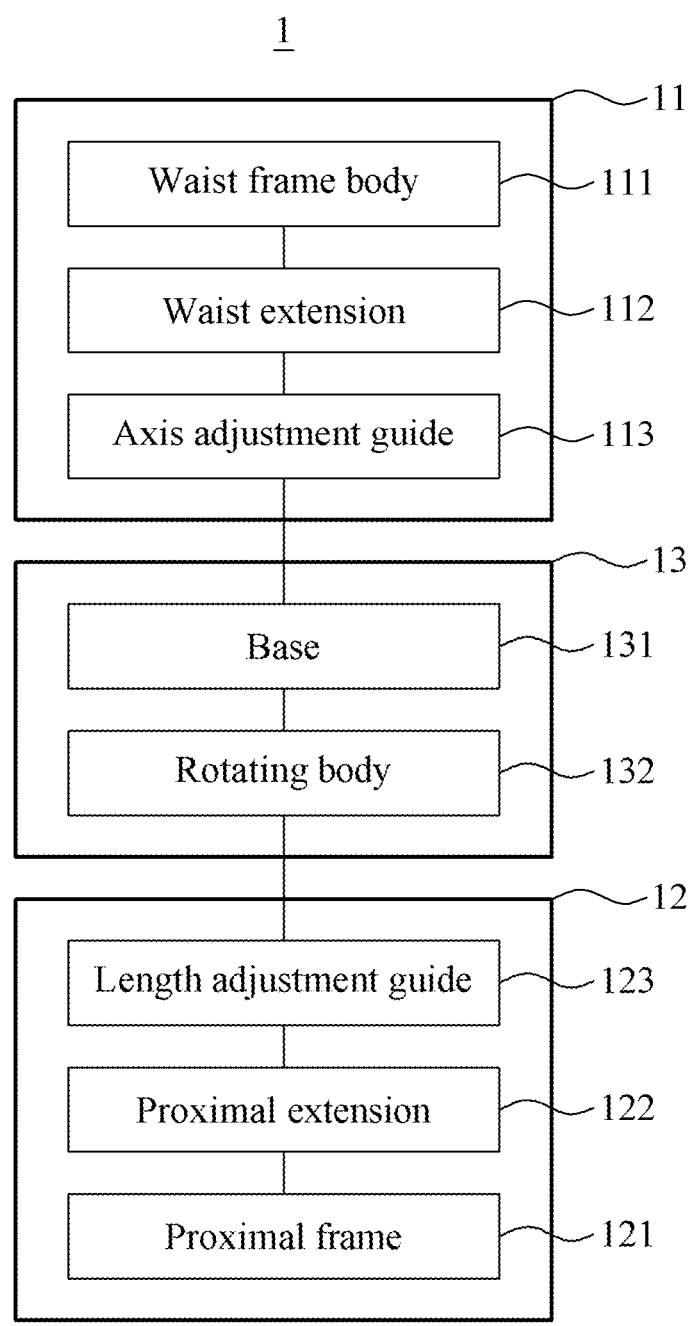
FIG. 7 is a block diagram illustrating a motion assistance apparatus according to at least one example embodiment.

FIG. 4 is a front view schematically illustrating a motion assistance apparatus according to at least one example embodiment, and FIG. 5 is a front view illustrating a state in which a position of a rotary coupler with respect to a waist frame is changed in the motion assistance apparatus of FIG. 4. FIG. 6 is a front view illustrating a state in which a position of a proximal support with respect to the rotary coupler of FIG. 5 is changed, and FIG. 7 is a block diagram illustrating a motion assistance apparatus according to at least one example embodiment.

Referring to FIGS. 4 through 7, a relative position between the waist extension 112 and the base 131 may be adjusted based on the axis adjustment guide 113 of the waist frame 11. Also, a relative position between the rotating body 132 and the proximal extension 122 may be adjusted based on the length adjustment guide 123 of the proximal support 12. A method of adjusting the position of the rotary coupler 13 and the position of the proximal support 12 by a user will be described below.

FIG. 4 schematically illustrates the waist frame 11, the proximal support 12 and the rotary coupler 13 in a state in which rotation axes of joints of the motion assistance apparatus and a hip joint and a knee joint of the user are aligned with each other when the user is standing upright. In the above state, the same angle between the thigh and the proximal support 12 may be maintained during a flexion or extension of a leg of the user.

FIG. 5 illustrates a state in which the rotation axis of the proximal support 12 with respect to the waist frame 11 is located above a hip joint axis of the user when the user is standing upright. The user may move the base 131 of the rotary coupler 13 upward from the waist extension 112 and may fix the base 131. In the above state, in a flexion or extension of a leg of the user, the angle between the thigh and the proximal support 12 may change. Thus, the angle between the thigh and the proximal support 12 may increase when a hip joint flexion angle of the user increases, which will be described below with reference to FIGS. 8 through 10. As a result, when the hip joint flexion angle increases, a force applied to the rear surface of the proximal part of the user by the proximal support 12 may increase. In other words, a pressure applied to the thigh of the user by the proximal support 12 in a sitting state in which the user is sitting may become greater than a pressure applied to the thigh of the user by the proximal support 12 in a standing state in which the user is standing upright.

When the position of the proximal support 12 is adjusted so that the proximal support 12 together with the rotary coupler 13 are raised, a rotation axis between the proximal support 12 and the distal support 14 as shown in FIG. 1 may no longer match an axis of the knee joint of the user.

To solve the above problem, FIG. 6 illustrates a state in which the proximal support 12 is moved downward and fixed with respect to the rotary coupler 13 when the user is standing upright. The user may move the proximal extension 122 downward from the rotating body 132 of the rotary coupler 13 and fix the proximal extension 122, to adjust the rotation axis between the proximal support 12 and the distal support 14 to match the axis of the knee joint.

Figure 9:
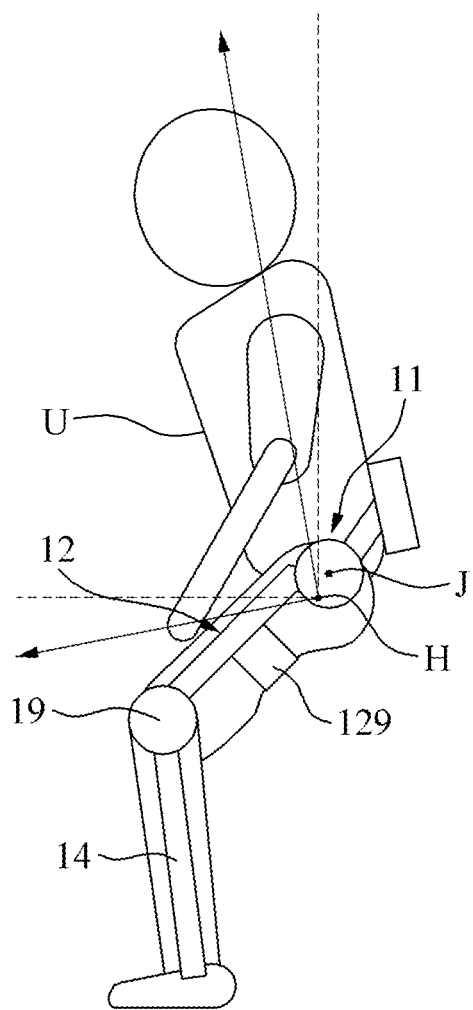
Figure 11:
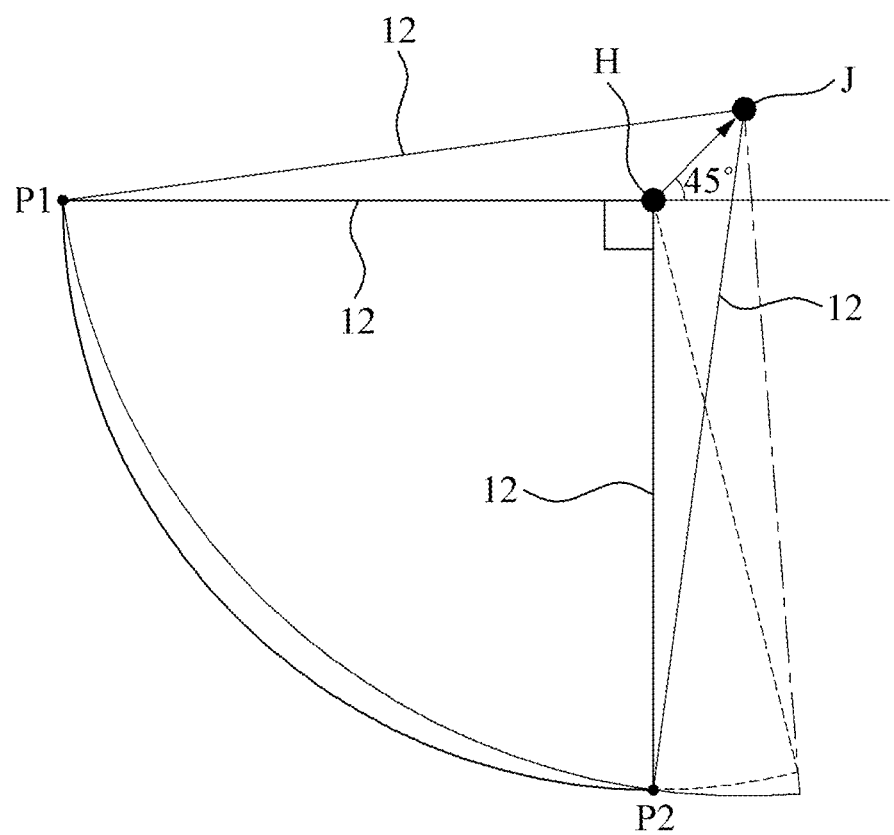
FIG. 11 schematically illustrates a moving route of a proximal support according to at least one example embodiment.

FIGS. 8 through 10 are side views illustrating a motion assistance apparatus according to at least one example embodiment, and illustrate a motion of a user transitioning from a standing state to a sitting state. FIG. 11 schematically illustrates a moving route of a proximal support according to at least one example embodiment.

Referring to FIGS. 8 through 11, the proximal support 12 may rotate about a rotation axis J that is misaligned with a hip joint H of the user. The rotation axis J may be understood as a rotation axis of the rotary coupler 13 of FIGS. 3 and 6. The rotation axis J may be spaced apart upward from the hip joint H.

Since the rotation axis J and the hip joint H are misaligned, the proximal support 12 may simulate a motion of the thigh approximately, not accurately. For example, even though the user is seated so that the thigh is parallel to the ground, the proximal support 12 may not be parallel to the ground as shown in FIG. 10.

In the standing state, the proximal support 12 may be substantially parallel to the thigh. The proximal action portion 129 may be in a state of being in contact with the thigh, or a state of slightly pressing the thigh.

While the standing state is changing to the sitting state, the proximal action portion 129 may more strongly press the thigh. For example, in an intermediate state between the standing state and the sitting state, a degree to which the thigh is pressed as shown in FIG. 10 is greater than a degree to which the thigh is pressed as shown in FIG. 9. The proximal action portion 129 may strongly press the rear surface of the thigh of the user in the sitting state. For example, when an additional force is applied to the thigh, the proximal action portion 129 may sufficiently press the rear surface of the thigh so that the thigh may be lifted.

The actuator 19 may generate a power to increase the angle between the proximal support 12 and the distal support 14, and accordingly the proximal support 12 may press the thigh. Since the proximal support 12 presses the thigh before the actuator 19 generates the power, the proximal support 12 may instantly react to a generation of the power of the actuator 19 and may increase an angle between the thigh and shin of the user.

As shown in the drawings, the rotation axis J may be located in a direction inclined upward at an angle between 40 degrees to 50 degrees, for example, 45 degrees, based on a direction from the hip joint H to the rear side.

FIG. 11 illustrates a first position P1 and a second position P2 based on a state in which the rotation axis J of the motion assistance apparatus 1 is aligned with the hip joint H. The first position P1 refers to a position of a distal end portion of the proximal support 12 in a sitting state in which the thigh is parallel to the ground. The second position P2 refers to a position of the distal end portion of the proximal support 12 in a standing state in which the thigh is perpendicular to the ground. When the rotation axis J moves in a direction inclined upward at 45 degrees, based on a direction from the hip joint H to the rear side, and when a length of the proximal support 12 increases, as shown in FIG. 11, the distal end portion of the proximal support 12 may be adjusted to pass through the first position P1 and the second position P2. By the above arrangement, in the sitting state and the standing state requiring a large amount of time in a daily life of the user, a joint of the motion assistance apparatus 1 may match the knee joint of the user. As shown in FIG. 11, a deviation in the moving route of the distal end portion of the proximal support 12 may be reduced before and after a movement of the rotation axis J, and thus it is possible to prevent a reduction in a wearability of the user.

Figure 12:
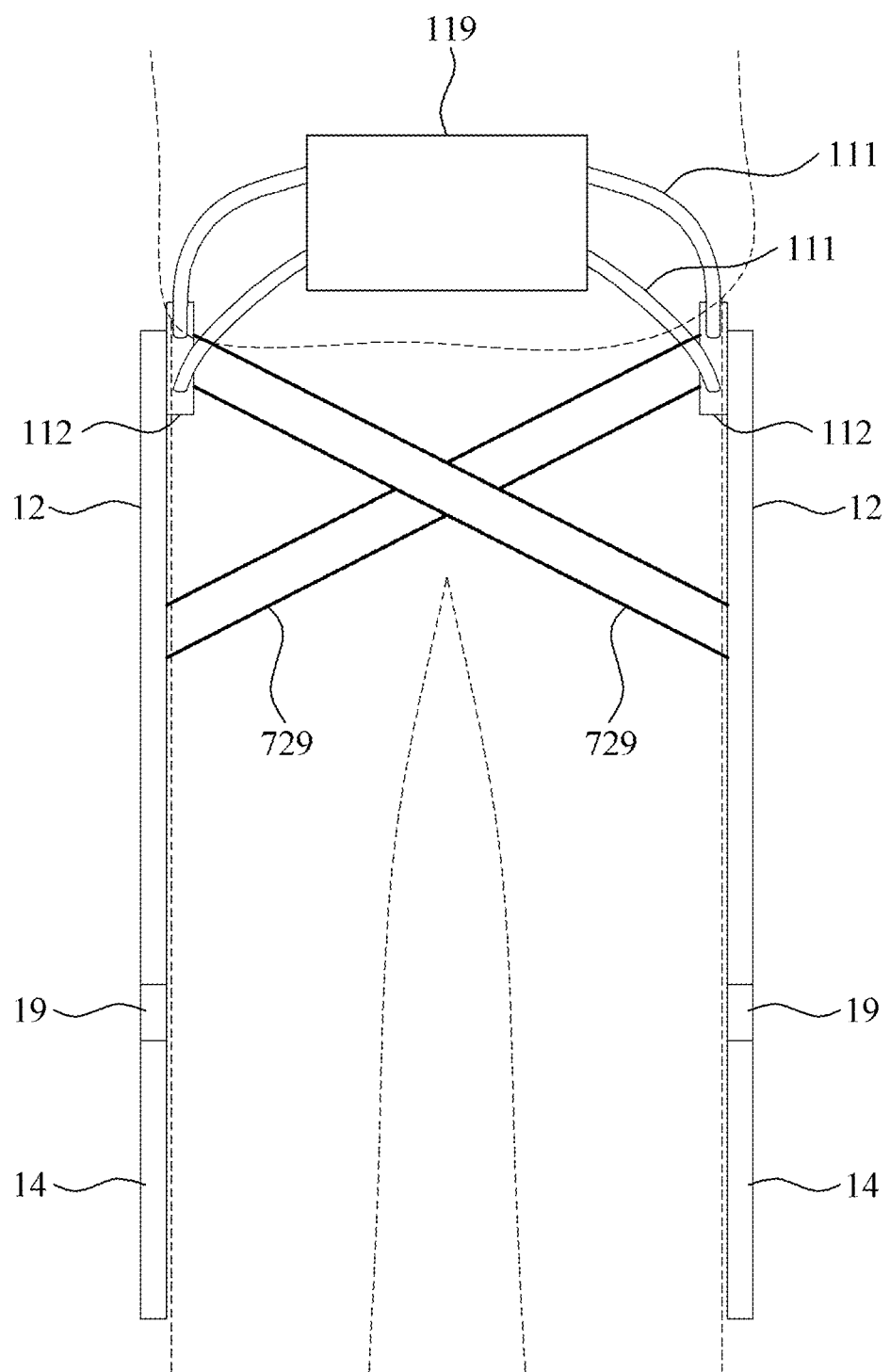
FIGS. 12 through 14 are rear views illustrating a motion assistance apparatus according to at least one example embodiment.

FIG. 12 is a rear view illustrating an example of a motion assistance apparatus according to at least one example embodiment.

Referring to FIG. 12, the motion assistance apparatus may include a proximal action portion 729. The proximal action potion 729 may be incorporated into the motion assistance apparatus 1 such that the proximal action portion 729 replaces the proximal action portion 129 or supplements the proximal action portion 129.

One end of the proximal action portion 729 may be connected to a proximal support 12 that supports one of a left thigh and a right thigh, and another end may be connected to a waist extension 112 on an opposite side. Two proximal action portions 729 may cross each other. By the above structure, the proximal action portions 729 may support a hip of a user. The hip of the user may be a part that supports a weight of the user in the sitting state, and may be in a state of being more strongly pressed than a thigh of the user. Thus, the proximal action portion 729 may be provided to press the hip of the user, to effectively assist a standing-up motion of the user.

Also, one end of the proximal action portion 729 may be fixed to a waist extension 112, and another end may be connected to the proximal support 12 that moves relative to the waist extension 112, and accordingly the proximal action portion 729 may press the hip of the user with the same effect as a movable pulley. Thus, the motion assistance apparatus 1 may provide a great force even though an actuator 19 with a relatively low output is used.

Figure 13:
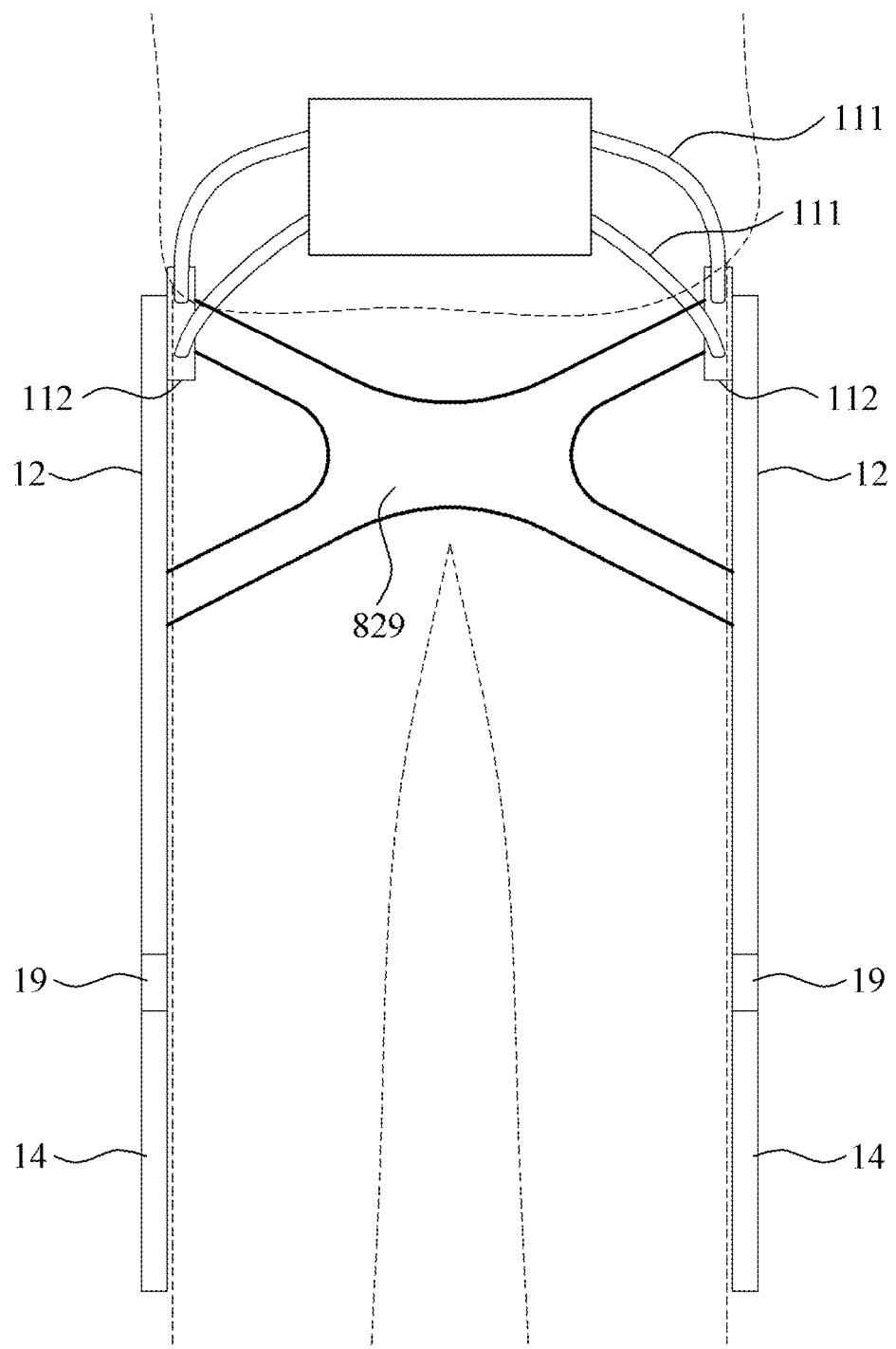

FIG. 13 is a rear view illustrating another example of a motion assistance apparatus according to at least one example embodiment.

Referring to FIG. 13, the motion assistance apparatus may include a proximal action portion 829. The proximal action potion 829 may be incorporated into the motion assistance apparatus 1 such that the proximal action portion 829 replaces the proximal action portion 129 or supplements the proximal action portion 129.

The proximal action portion 829 may include a body part, and four extension parts that extend in four directions from the body part and that are connected to a left proximal support 12, a left waist extension 112, a right proximal support 12 and a right waist extension 112, respectively. For example, the body part and the extension parts may be formed integrally with each other, or a separate body part and separate extension parts may be combined. In the example of FIG. 13, a force may be more equally provided to a hip of a user.

Figure 14:
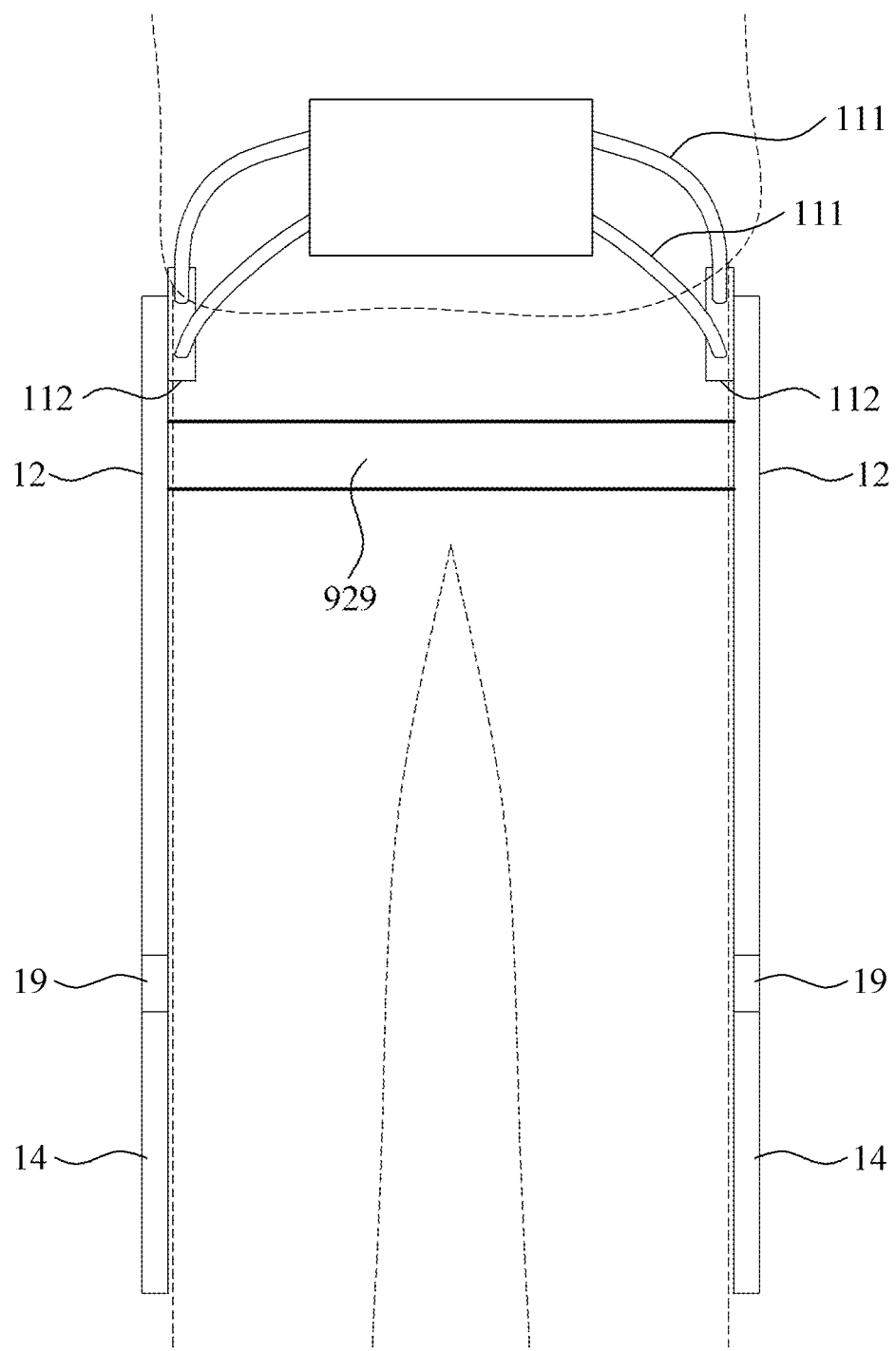

FIG. 14 is a rear view illustrating still another example of a motion assistance apparatus according to at least one example embodiment.

Referring to FIG. 14, the motion assistance apparatus may include a proximal action portion 929 having both ends connected to a left proximal support 12 and a right proximal support 12. The proximal action potion 929 may be incorporated into the motion assistance apparatus 1 such that the proximal action portion 929 replaces the proximal action portion 129 or supplements the proximal action portion 129. In the example of FIG. 14, a hip of a user may be pressed using a relatively simple structure.

Figure 15:
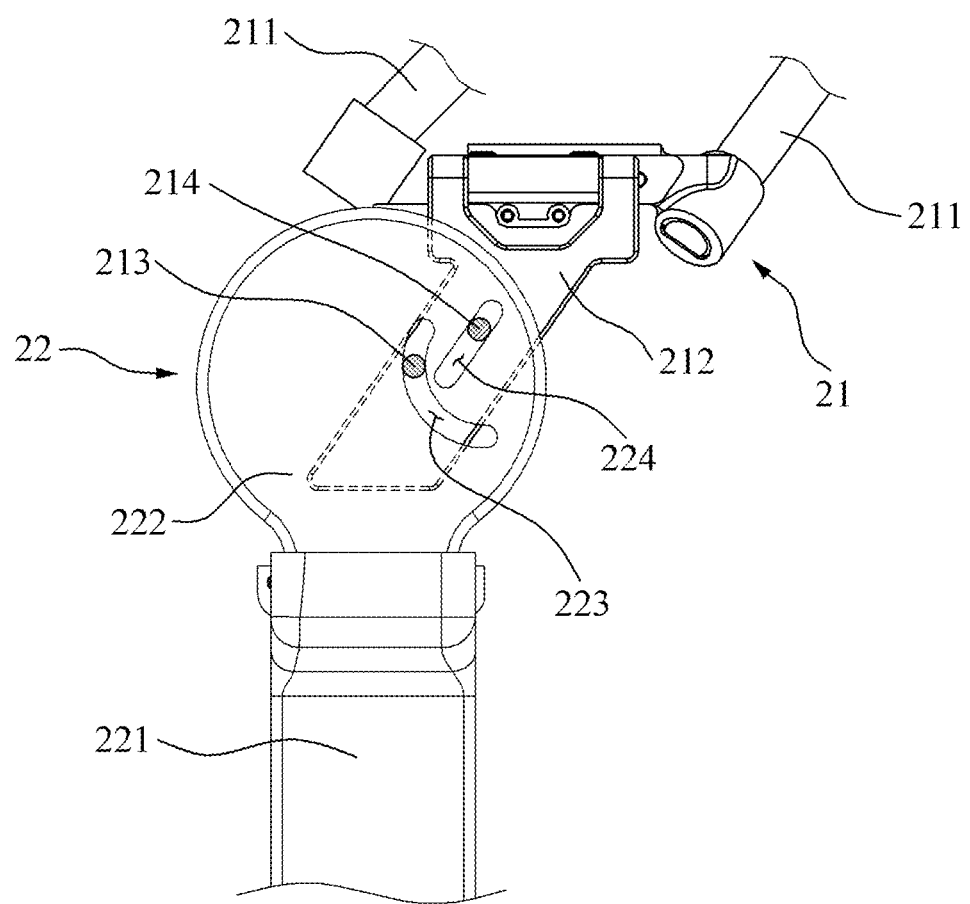
FIGS. 15 through 17 are side views illustrating a motion assistance apparatus according to at least one example embodiment.
Figure 16:
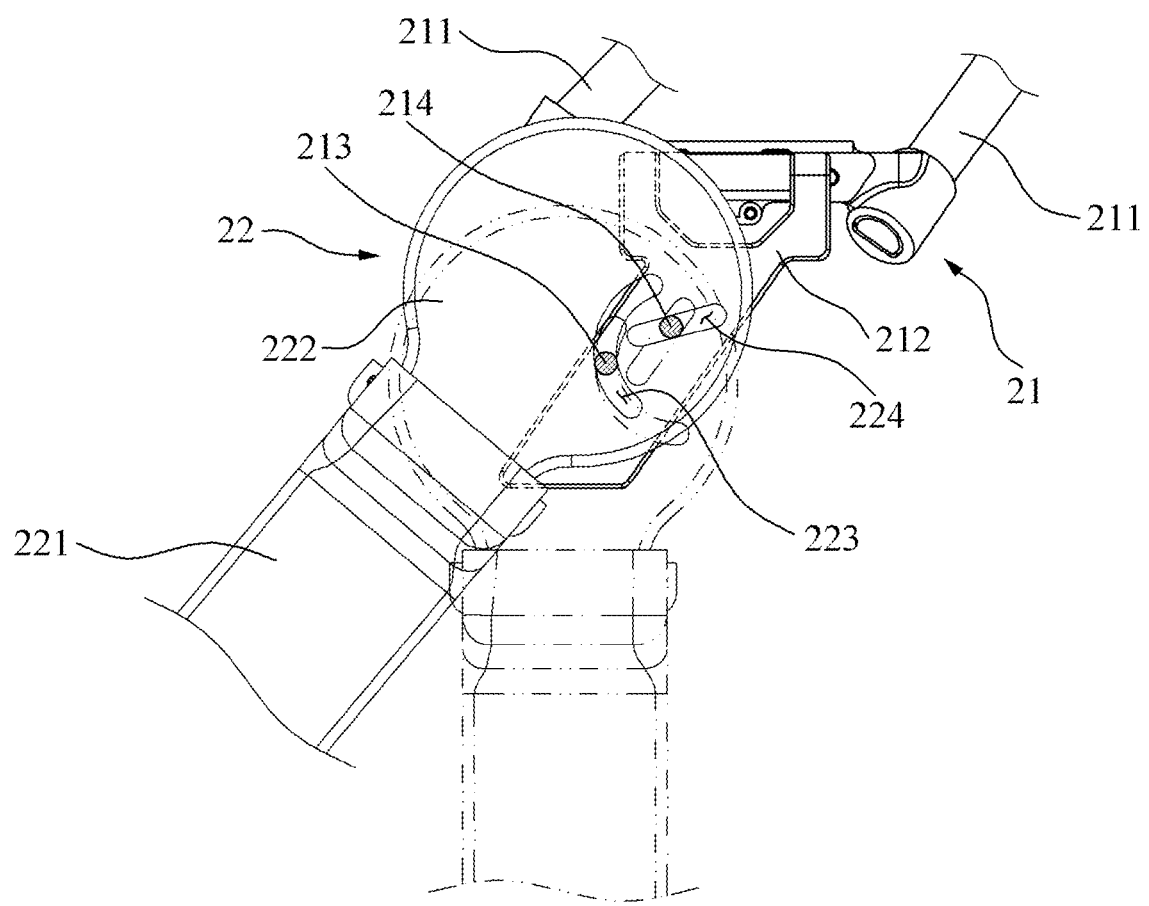
Figure 17:
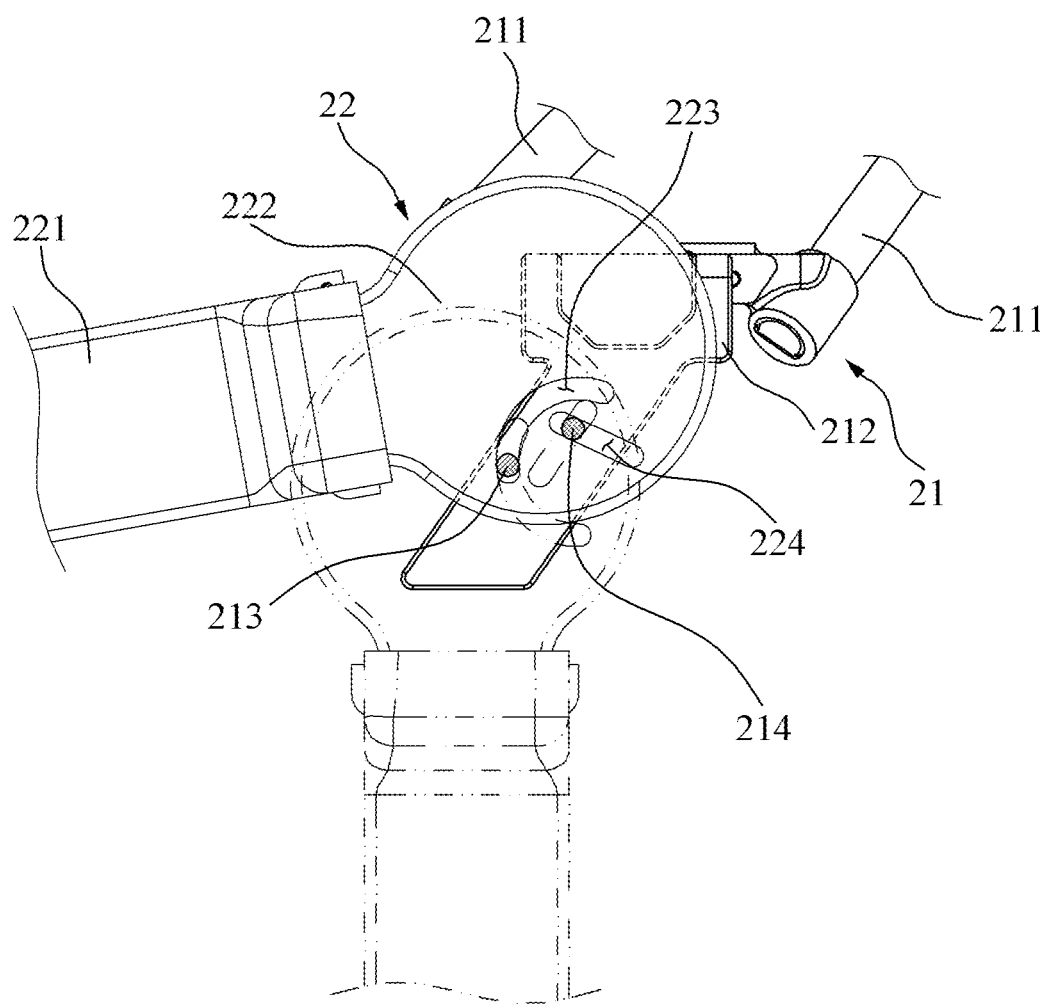

FIGS. 15 through 17 are side views illustrating a motion assistance apparatus according to at least one example embodiment, and illustrate a motion of a user transitioning from a standing state to a sitting state.

Referring to FIGS. 15 through 17, a motion assistance apparatus 2 may include a waist frame 21 and a proximal support 22.

The proximal support 22 may be connected to the waist frame 21 to simultaneously perform a rotation and a translation with respect to the waist frame 21. While a standing state in which a user is standing upright as shown in FIG. 15 is changing to a sitting state in which the user is sitting as shown in FIG. 17, the proximal support 22 may move upward with respect to the waist frame 21. For example, as shown in FIGS. 15 through 17, when the proximal support 22 is rotating in a clockwise direction with respect to the waist frame 21, the proximal support 22 may perform a translation upward along the waist frame 21. Thus, when a flexion angle of a hip joint of the user increases, the proximal support 22 may press a rear surface of a proximal part of the user.

The waist frame 21 may include a waist frame body 211, a waist extension 212, a first projection 213 and a second projection 214.

The first projection 213 and the second projection 214 may be formed to protrude from the waist extension 212. The first projection 213 and the second projection 214 may be inserted into a first guide slot 223 and a second guide slot 224 of the proximal support 22, respectively. The second projection 214 may be spaced apart from the first projection 213 by a desired (or, alternatively, a predetermined) length. The second projection 214 may be located on a side further to a rear side of the user than the first projection 213 (that is, located on a right side of the first projection 213 in the drawings).

The proximal support 22 may include a proximal frame 221, a head plate 222, the first guide slot 223 and the second guide slot 224. The proximal frame 221 may be approximately parallel to a thigh of the user, and a head plate 222 may extend from the proximal frame 221 and face the waist extension 212.

The first guide slot 223 and the second guide slot 224 may be formed in the head plate 222. A distance between a first position corresponding to an arbitrary percentage with respect to a total length of the first guide slot 223 and a second position corresponding to the arbitrary percentage with respect to a total length of the second guide slot 224 may be designed to be equal to the distance between the first projection 213 and the second projection 214. Also, a diameter of each of the first projection 213 and the second projection 214 may be equal to a width of each of the first guide slot 223 and the second guide slot 224. By the above structure, when the first projection 213 is moving along the first guide slot 223, the second projection 214 may move along the second guide slot 224. As a result, the proximal support 22 may move in one degree of freedom (DOF) with respect to the waist frame 21.

Also, the first guide slot 223 and the second guide slot 224 may have different lengths. By the above structure, a relatively speed between the first projection 213 and the second projection 214 may be generated based on a local coordinate system fixed to the head plate 222 that is one rigid material. Thus, the proximal support 22 may simultaneously perform a rotation and a translation with respect to the first projection 213 and the second projection 214 that are fixed.

For example, a length of the first guide slot 223 may be greater than a length of the second guide slot 224 that is located on the side further to the rear side of the user than the first guide slot 223. By the above structure, a maximum flexion angle of the proximal support 22 may be greater than a maximum extension angle.

In the standing state of FIG. 15, a first central point corresponding to a central portion of a virtual line connecting the first projection 213 and the second projection 214 may be located above a second central point corresponding to a central portion of a virtual line connecting a lower end of the first guide slot 223 and a lower end of the second guide slot 224. By the above structure, a height of the head plate 222 with respect to the waist frame 21 in the sitting state of FIG. 17 may be greater than a height of the head plate 222 in the standing state of FIG. 15, and thus the rear surface of the proximal part of the user may be pressed in the sitting state.

Also, based on the standing state, the first guide slot 223 may continue to extend downward and backward. By the above shape, when the standing state is changing to the sitting state, a pressure applied to the rear surface of the proximal part of the user by the proximal support 22 (e.g., an action portion of the proximal frame 221) may gradually increase.

For example, the first guide slot 223 may have a shape of an arc extending downward and backward as shown in FIG. 15. In this example, the second guide slot 224 may be designed to correspond to the shape of the first guide slot 223, based on the distance between the first projection 213 and the second projection 214. For example, the second guide slot 224 may have a shape that extends toward a curved portion of the first guide slot 223 as shown in FIG. 15.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion assistance apparatus comprising:
    a waist frame configured to support a waist of a user;
    a proximal support configured to support a proximal part of the user; and
    a rotary coupler configured to connect the waist frame and the proximal support at a selected one of a plurality of different positions such that a position at which the proximal support is connected to the waist frame via the rotary coupler varies based on the selected one of the plurality of different positions,
    wherein the waist frame includes an axis adjustment guide on the waist frame such that the axis adjustment guide is tilted upward toward a rear side of the waist frame, the axis adjustment guide configured to adjust a relative position between the waist frame and the rotary coupler; and
    wherein the rotary coupler includes,
        a base installable in the axis adjustment guide at different ones of the plurality of different positions, and
        a rotating body rotatably connected to the base.

2. The motion assistance apparatus of claim 1, wherein the proximal support comprises:
    a length adjustment guide on the proximal support, the length adjustment guide configured to adjust a relative position between the rotary coupler and the proximal support.

3. The motion assistance apparatus of claim 1, wherein the axis adjustment guide has a plurality of axis adjustment holes arranged in parallel therein.

4. The motion assistance apparatus of claim 1, wherein the axis adjustment guide is tilted upward and backward at 45 degrees when the user is in a standing state.

5. The motion assistance apparatus of claim 1, wherein the proximal support comprises:
    a proximal frame perpendicular to a ground when the user is in a standing state; and
    a proximal extension extending backward and upward from the proximal frame, the proximal extension configured to connect to the rotary coupler.

6. The motion assistance apparatus of claim 1, wherein the proximal support is configured to support a rear surface of the proximal part of the user, and the motion assistance apparatus further comprises:
    a distal support rotatably connected to the proximal support, the distal support configured to support a distal part of the user; and
    an actuator configured to generate a force to change an angle between the distal support and a proximal frame.

* * * * *